United States Patent
Krampe et al.

[11] Patent Number: 5,960,627
[45] Date of Patent: Oct. 5, 1999

[54] METHOD AND DEVICE FOR CONTROLLING AN INTERNAL COMBUSTION ENGINE

[75] Inventors: Wolfgang Krampe, Renningen, Germany; Arno Hafner, Hinterbrühl, Austria

[73] Assignee: Robert Bosch GmbH, Stuttgart, Germany

[21] Appl. No.: 08/849,702
[22] PCT Filed: Apr. 17, 1996
[86] PCT No.: PCT/DE96/00660
  § 371 Date: May 22, 1997
  § 102(e) Date: May 22, 1997
[87] PCT Pub. No.: WO97/11269
  PCT Pub. Date: Mar. 27, 1997

[30] Foreign Application Priority Data

Sep. 22, 1995 [DE] Germany .............. 195 35 162

[51] Int. Cl.⁶ ............ F02M 45/02; F01N 3/20; F02D 41/40
[52] U.S. Cl. ............... 60/274; 60/286; 123/300
[58] Field of Search ............... 60/274, 284, 285, 60/286; 123/299, 300

[56] References Cited

U.S. PATENT DOCUMENTS

| | | | |
|---|---|---|---|
| 3,626,910 | 12/1971 | Porsche et al. | 123/483 |
| 4,452,040 | 6/1984 | Kobashi | 60/285 X |
| 4,633,837 | 1/1987 | Babitzka et al. | 123/478 |
| 5,193,340 | 3/1993 | Kamihara | 60/286 |
| 5,207,058 | 5/1993 | Sasaki et al. | 60/284 |
| 5,343,702 | 9/1994 | Miyajima et al. | 60/285 |
| 5,479,775 | 1/1996 | Kraemer et al. | 60/285 X |
| 5,642,705 | 7/1997 | Morikawa et al. | 60/285 X |

FOREIGN PATENT DOCUMENTS

| | | | |
|---|---|---|---|
| 70619 | 1/1983 | European Pat. Off. | 60/311 |
| 4-231645 | 8/1992 | Japan. | |
| 5-156993 | 6/1993 | Japan. | |
| 6-117225 | 4/1994 | Japan. | |

*Primary Examiner*—Tony M. Argenbright
*Attorney, Agent, or Firm*—Kenyon & Kenyon

[57] ABSTRACT

A method and a device for controlling an internal combustion engine, in which first device meters fuel to the internal combustion engine that is burned in the internal combustion engine. Second device performs an exhaust gas aftertreatment. A post-injection takes place, in the case of which, following the combustion, the first device meters fuel which reacts in the second device.

10 Claims, 5 Drawing Sheets

0  90  180 270 360 450 540 630  0  90  180
  45 135 225 315 405 495 585 675  45 135 225

METHOD AND DEVICE FOR CONTROLLING AN INTERNAL COMBUSTION ENGINE

FIELD OF THE INVENTION

The present invention relates to a method and a device for controlling an internal combustion engine.

BACKGROUND INFORMATION

A method and a device for controlling an internal combustion engine are disclosed, for example, in German Patent Application No. 34 36 768 (U.S. Pat. No. 4,633,837).

In diesel gasoline engines, it is also known to meter hydrocarbons into the exhaust pipe using a metering pump. These hydrocarbons and the nitrous oxides contained in the exhaust gas are converted in a reduction catalytic converter into carbon dioxide, nitrogen, and water.

To render possible this reduction of nitrous oxides, a dosing device must be additionally provided.

SUMMARY OF THE INVENTION

An object of the present invention is to improve the exhaust emission properties, keeping the outlay and costs as low as possible.

The procedure in accordance with the present invention will enable the exhaust emission properties of the internal combustion engine to be improved cost-effectively.

DETAILED DESCRIPTION

Figure 1:
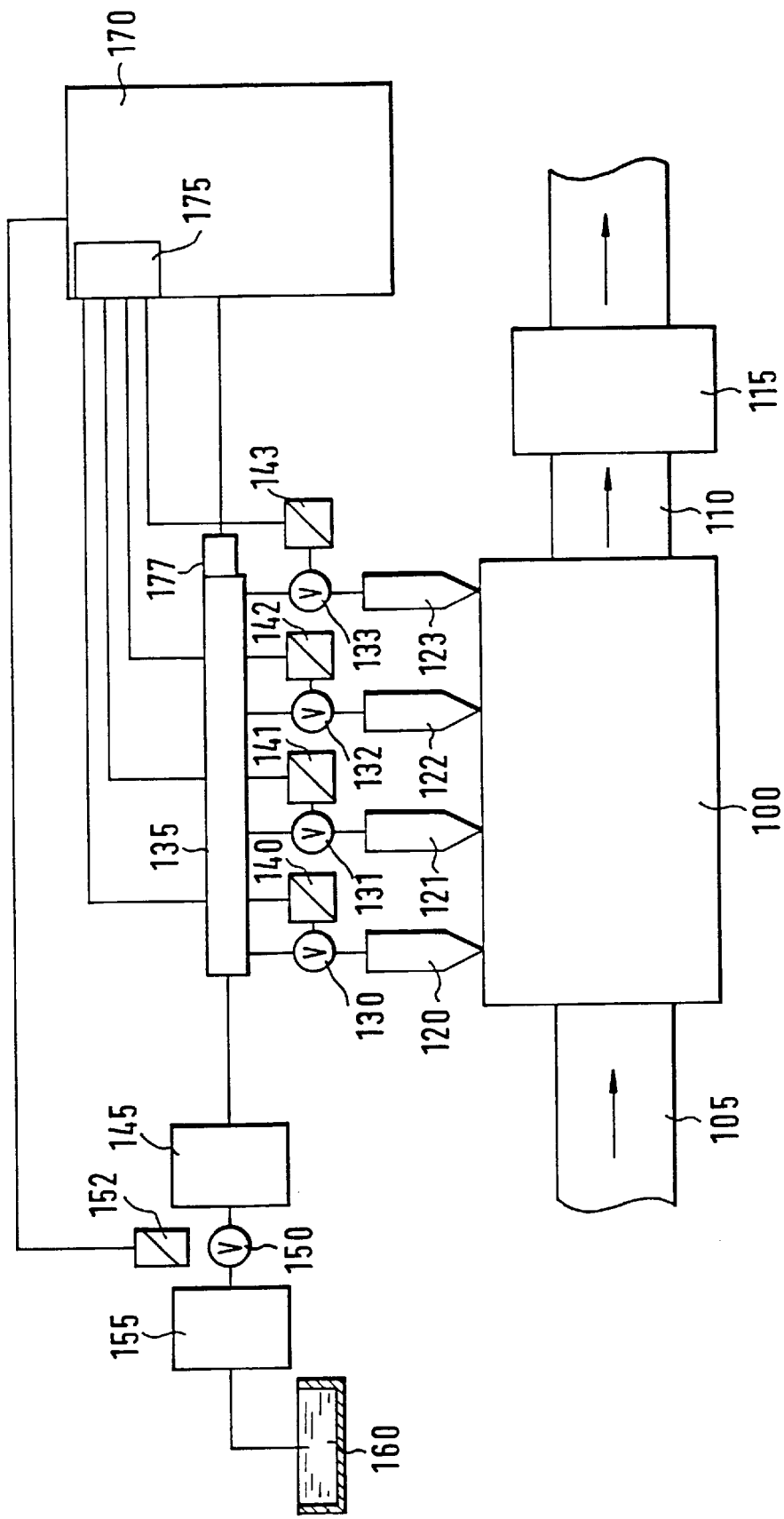
FIG. 1 shows the fuel metering system according to the present invention.

The device according to the present invention is illustrated in the following based on the example of a self-ignition internal combustion engine, where the fuel metering is controlled by means of a solenoid valve. The specific embodiment shown in FIG. 1 relates to a "common-rail system". However, the procedure in accordance with the present invention is not limited to these systems. It can be employed in all systems where an appropriate fuel metering is possible. This is the case in solenoid-valve-controlled fuel metering systems.

100 denotes an internal combustion engine which is supplied with fresh air via an intake line 105 and gives off exhaust gas via an exhaust pipe 110. A reduction catalytic converter 115 is arranged in exhaust pipe 110.

The illustrated internal combustion engine is a four-cylinder internal combustion engine. Each cylinder of the internal combustion engine has an allocated injector 120, 121, 122 and 123. Fuel is metered via solenoid valves 130, 131, 132 and 133 to the injectors. The fuel arrives from a "rail" 135 via injectors 120, 121, 122 and 123 into the cylinders of internal combustion engine 100.

The fuel in rail 135 is pressurized to an adjustable pressure by a high-pressure pump 145. High-pressure pump 145 is connected via a solenoid valve 150 to a fuel-supply pump 155. The fuel-supply pump communicates with a fuel supply tank 160.

Valve 150 comprises a coil 152. Solenoid valves 130, 131, 132 and 133 contain coils 140, 141, 142 and 143, which are each able to receive current by means of an output stage 175. Output stages 175 are preferably arranged in a control unit 170, which drives coil 152 accordingly.

In addition, a sensor 177 is provided, which detects the pressure prevailing in rail 135 and directs a corresponding signal to control unit 170.

The functioning of this device will be described as follows. Fuel-supply pump 155 delivers the fuel from the supply tank via valve 150 to high-pressure pump 145. High-pressure pump 145 builds up a specifiable pressure in rail 135. Pressure values greater than 800 bar are usually attained in rail 135.

Current is applied to coils 140 to 143 to drive the corresponding solenoid valves 130 to 133. The drive signals for the coils thereby establish the beginning and end of fuel injection through injectors 120 to 123.

The metered fuel burns in internal combustion engine 100, forming exhaust gas which contains nitrous oxides as undesirable constituents. These nitrous oxides are reduced in catalytic converter 115 with the aid of hydrocarbons. The present invention provides for fuel to be additionally metered by means of injectors 120 through 123 following the combustion. This fuel quantity is expelled with the exhaust gas and reacts in catalytic converter 115 together with the nitrous oxide to form harmless constituents. The supplemental injection of fuel following the actual injection is described as post-injection. The post-injection preferably takes place within the range of the bottom dead center of the cylinder in question.

Figure 2:
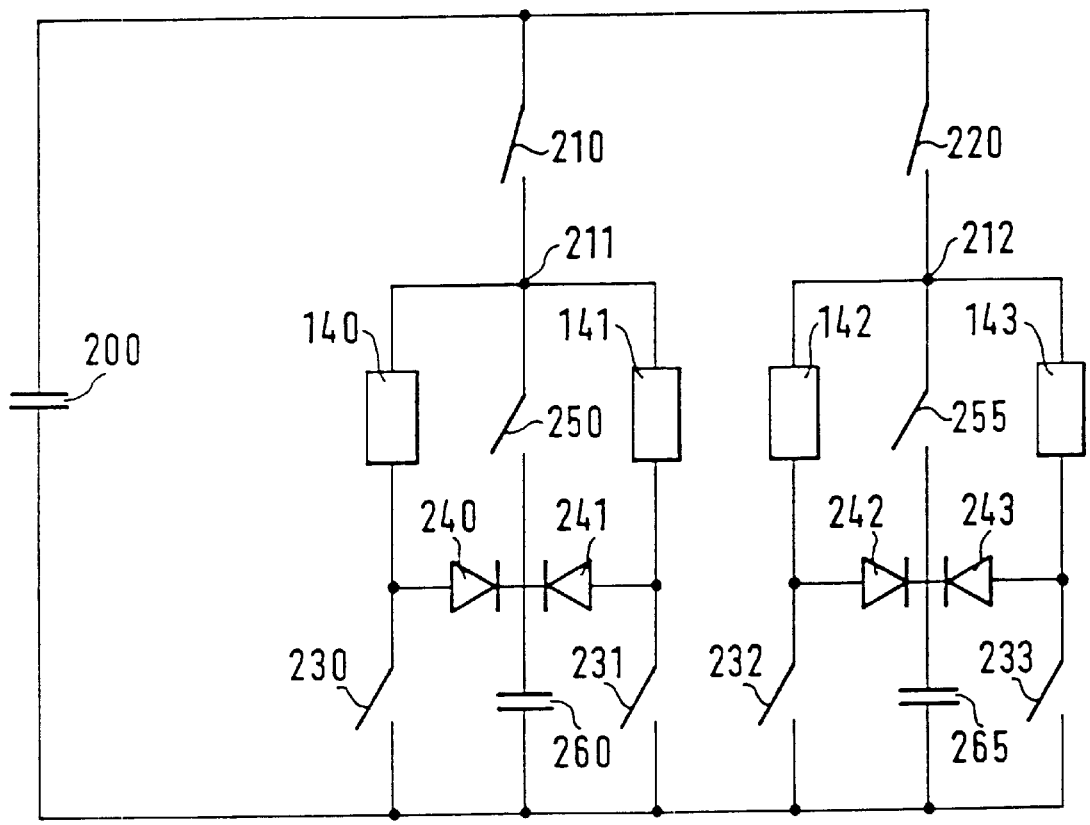
FIG. 2 depicts an output stage for driving various load-circuit components of the device according to the present invention.

FIG. 2 shows one possible realization of output stage 175. A voltage source is designated by 200. A first terminal of the voltage source, i.e., the positive terminal in the illustrated specific embodiment, is linked via a switching element 210 to a connection point 211. Connected to this connection point 211 is the first terminal of coil 140 and the first terminal of coil 141. The second terminal of coil 140 is connected via a switching element 230 to the second terminal of voltage source 200. Accordingly, the second terminal of coil 141 is connected via a switching element 231 to voltage source 200.

The connector lead between coil 140 and switching element 230 is in contact via a diode 240 and a switching element 250 with connection point 211. Correspondingly, the second terminal is in contact via a diode 241 and switching element 250 with connection point 211. The shared terminal of the cathodes of diodes 240 and 241 is connected, on the one hand, to switching element 250 and, on the other hand, via a capacitor 260 to voltage source 200.

Furthermore, the first terminal of the voltage source is connected via a switching element 220 to a connection point 212. The first terminal of coil 142 and the first terminal of coil 143 are linked to this connection point 212. The second terminal of coil 142 is connected via a switching element 232 to the second terminal of voltage source 200. Correspondingly, the second terminal of coil 143 is linked via a switching element 233 to voltage source 200.

The connector lead between coil 142 and switching element 232 is in contact via a diode 242 and a switching element 255 with point 212. Correspondingly, the second terminal is in contact via a diode 243 and switching element 255 with point 212. The shared terminal of the cathodes of diodes 242 and 243 communicates, on the one hand, with switching element 255 and, on the other hand, via a capacitor 265 with voltage source 200.

Switching elements 210 and 220 are usually referred to as high-side switches, and switching elements 230, 231, 232 and 233 as low-side switches. Switching elements 250 and 255 are referred to as recharging switches, and capacitors 260 and 265 as step-up capacitors 260 and 265.

The switching elements are preferably realized as transistors, in particular as field-effect transistors. The switching elements can be driven by control unit 170 through application of appropriate driving signals.

The functioning of this arrangement will be described in the following. The low-side switch is driven to release the current flow through the coil assigned at any one time. By means of the high-side switch, the current flowing through the coil can be controlled in closed loop to specifiable setpoint values.

When the low-side switch is opened, a high voltage is induced in the coils, and the thereby released energy recharges capacitors 260 and 265. To enable the solenoid valves to respond rapidly, switching elements 250 and 255 are driven at the beginning of the activation, and the coils are consequently loaded with a high voltage, which is applied to capacitors 260 and 265.

The capacitance of capacitors 260 and 265 is quite substantial, so that they require a very large installation space in control unit 170. One aspires to have as few as possible capacitors to be able to economize on costs and installation space. To this end, the aim is to have a large number of coils driven by means of a shared high-side switch and, correspondingly, for only one capacitor to be provided at any one time.

A group of load-circuit components, which are to be driven by a shared high-side switch or the cylinders assigned to them, is described as a bank. Because of the type of coil activation, in particular because the voltage is stepped up by the capacitors, it is not possible for two coils to be driven simultaneously. This means it is only possible for one cylinder of a bank to be injected at a time.

Figure 3A:
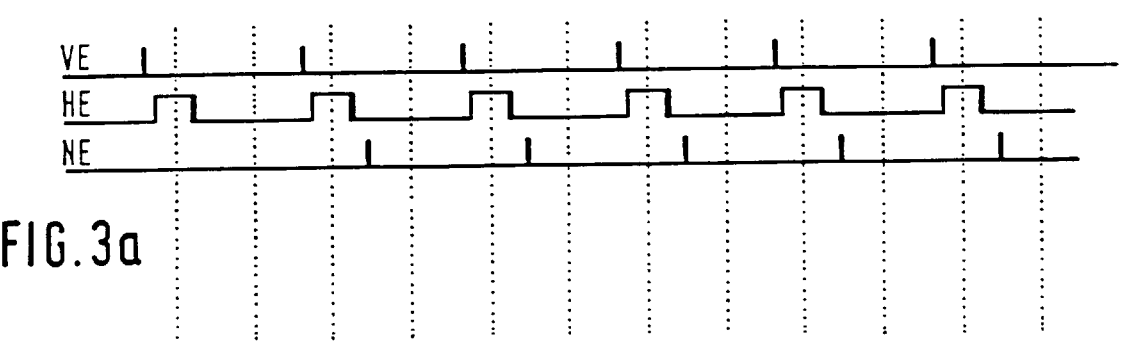
FIG. 3a shows a first metering cycle of a first engine type plotted over the arc of crankshaft rotation.
Figure 3B:
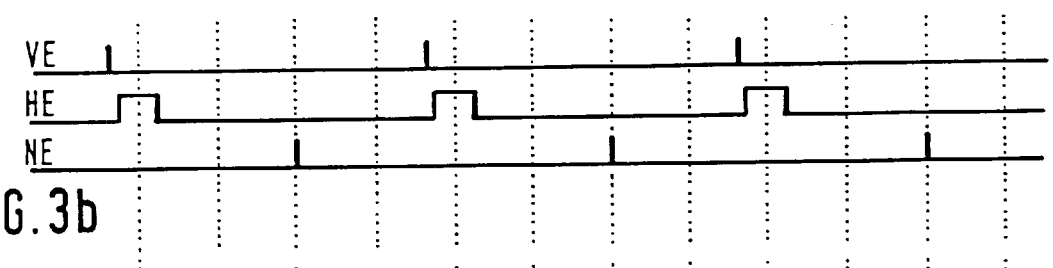
FIG. 3b shows a second metering cycle of a first engine type plotted over the arc of crankshaft rotation.
Figure 3C:
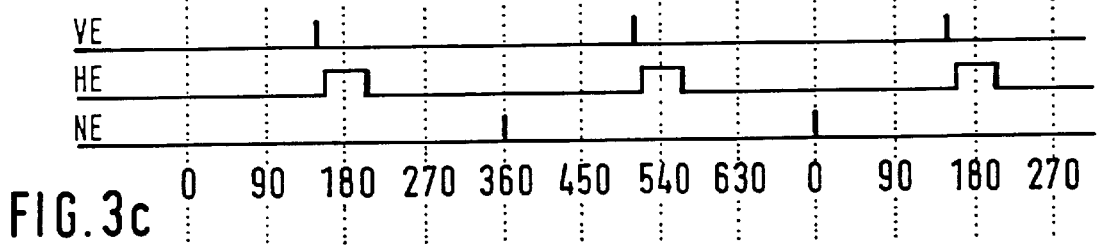
FIG. 3c shows a third metering cycle of a first engine type plotted over the arc of crankshaft rotation.

FIGS. 3a–3c illustrate the relationships when working with a four-cylinder internal combustion engine. The injections into the individual cylinders are plotted over the angular position of the crankshaft. In FIG. 3a, the pre-injection VE is plotted in the first line, the main injection HE in the second line, and the post-injection NE in the third line.

The main injection HE into the first cylinder takes place near the top dead center of the first cylinder. The top dead center is situated at 0 degrees arc of crankshaft rotation. The main injection HE begins at about 20 degrees before the top dead center and has a duration of about 40 degrees. The pre-injection VE lies just before the main injection HE at about minus 50 degrees before the top dead center. As a rule, the pre-injection extends over a few degrees.

The metering into the second cylinder takes place in the top dead center of the second cylinder, i.e., 180 degrees after the top dead center of the first cylinder. The pre-injection VE of the second cylinder lies, in turn, 40 to 50 degrees before the top dead center of the second cylinder, i.e., between 130 and 140 degrees after the top dead center of the first cylinder.

Correspondingly, the metering into the other cylinders takes place at 360 and 540 degrees after the top dead center of the first cylinder.

In accordance with the present invention, the post-injection NE is required to take place in the range of between 100 and 270 degrees following the top dead center of the cylinder in question, to be able to achieve a good catalytic converter effect. A preferred value for the post-injection lies at 150 degrees following the top dead center. As the schematic representation of FIG. 3a shows, the metering for the second cylinder lies at the value 150 degrees following the top dead center of the first cylinder. This angular value is not feasible for the post-injection with the corresponding output stage, since it is not possible for two injections to be made simultaneously into different cylinders with one output stage. In accordance with the present invention, the post-injection is set within an angular range of between 200 and 240 degrees after the top dead center of the corresponding injection. This means the post-injection takes place following the main injection of the following cylinder.

FIGS. 3b and 3c show the relationships when working with a four-cylinder internal combustion engine, where two banks are provided. The metering intervals of the first bank are shown in FIG. 3b, and the metering intervals of the second bank are shown in FIG. 3c. The first and the third cylinder are assigned in the firing order to the first bank, and the second and fourth cylinder to the second bank. The pre-injection VE and the main injection HE of the individual cylinders take place at the corresponding angular positions, as shown in FIG. 3a.

The metering ranges, i.e., the beginning of injection, the end of injection and, thus, the injection duration of the individual metering operations of the pre-injections and main injections are controlled as a function of various operating parameters and vary within a certain range in dependence upon these operating conditions.

As shown in FIG. 3b, the post-injection can be selected at the preferred instant, i.e., at 150 degrees crankshaft following the top dead center of the cylinder in question. This is possible since the metering into the second cylinder, which takes place at this instant, is controlled by the second bank.

The advantage offered by this procedure is that the range within which the post-injection can take place is able to be adjusted as needed within the range of between 100 and 270 degrees following the top dead center of the cylinder in question. The drawback of this arrangement is that the cylinders or the solenoid valves have to be divided into two banks, so that two output stages are necessary.

Figure 4A:
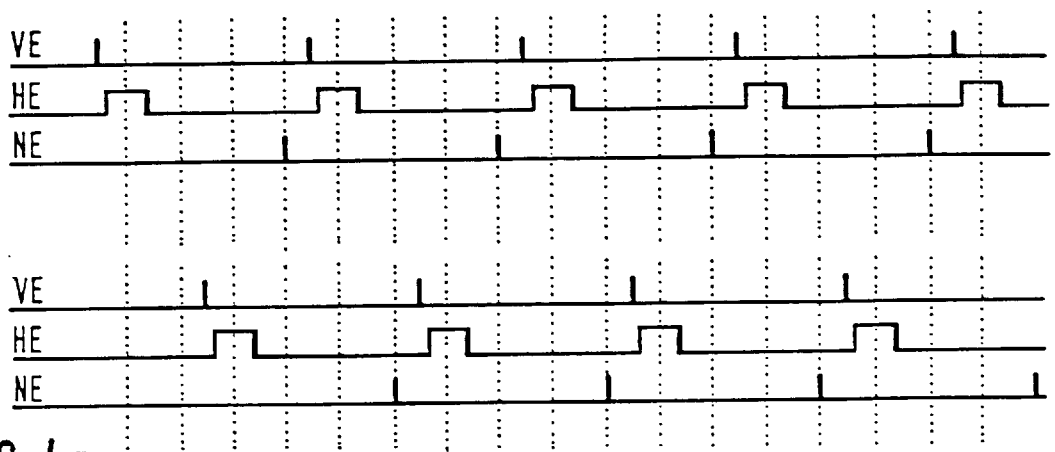
FIG. 4a shows a first metering cycle of a second engine type plotted over the arc of crankshaft rotation.
Figure 4B:
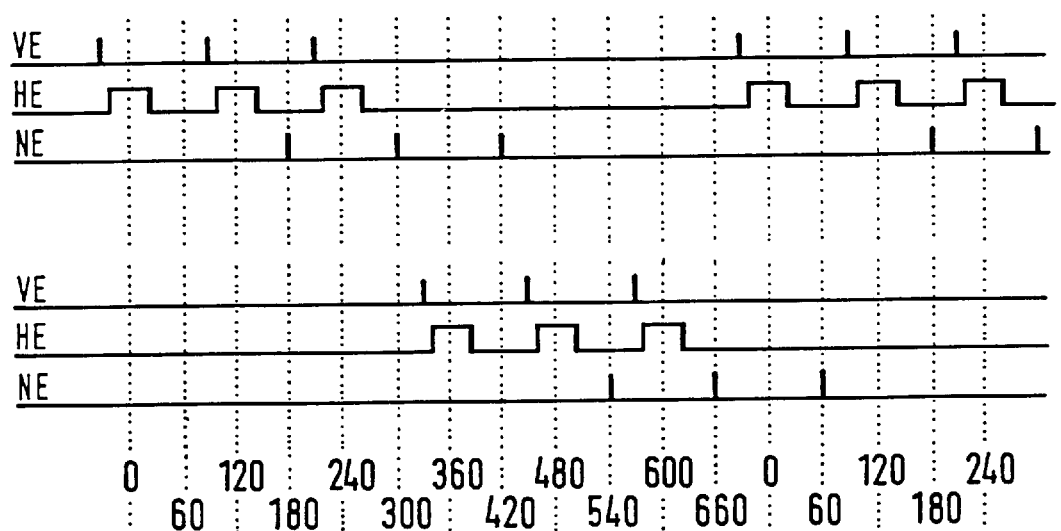
FIG. 4b shows a second metering cycle of a second engine type plotted over the arc of crankshaft rotation.

In FIGS. 4a and 4b, the relationships are depicted based on the example of an internal combustion engine having six cylinders. In the specific embodiment in accordance with FIG. 4a, the first, the third, and the fifth cylinder are assigned in the firing order to the first bank, and the second, the fourth, and the sixth cylinder to the second bank. The intervals between the individual injections amount to about 120 degrees arc of crankshaft rotation.

The pre-injections lie within the range of between 40 and 50 degrees before the top dead center of the cylinder in question. As shown in FIG. 4a, the pre-injection in the second cylinder of the same bank is situated between 190 and 200 degrees after the top dead center of the first cylinder.

A desired post-injection at about 150 degrees crankshaft following the top dead center of the first cylinder cannot be realized in all operating conditions, since the metering into the second cylinder can begin once this angular position is reached. If one considers a necessary pause time to charge the capacitor and to transfer new values, a post-injection is possible merely up to 150 degrees crankshaft following the top dead center of the cylinder in question.

FIG. 4b illustrates one embodiment in accordance with the present invention, where the first, the second, and the third cylinder are assigned to a first bank, and the fifth and sixth cylinder to the second bank. In the case of four of the six cylinders, a post-injection is possible in the range of between 160 and 360 degrees after the top dead center. In the case of two of the six cylinders, a post-injection is possible in the range of between 100 and 360 degrees after the top dead center.

It was recognized in accordance with the present invention that a post-injection does not have to take place with every injection. It suffices when a post-injection merely follows now and then. Thus, a post-injection may take place with only every n-th metering. The number n can be defined as a function of the operating state in question and/or of the required quantity of the post-injection.

As FIG. 4b reveals, the post-injection, which is assigned to the first cylinder, is only possible within a small angular range of 180 degrees following the top dead center of the first cylinder. The post-injection, which is allocated to the second or third cylinder, is possible within a very large angular range of between 300 and 660 degrees following the top dead center of the first cylinder. By allocating the individual cylinders in accordance with the present invention to the individual banks or output stages, the post-injection of the third cylinder or of the sixth cylinder in the firing order can be varied within a broad angular range.

Figure 5A:
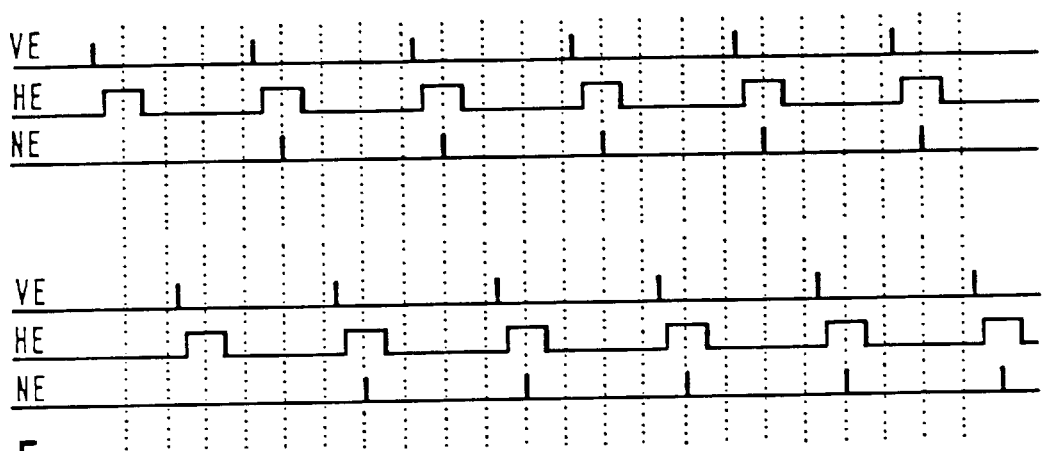
FIG. 5a shows a first metering cycle of a third engine type plotted over the arc of crankshaft rotation.
Figure 5B:
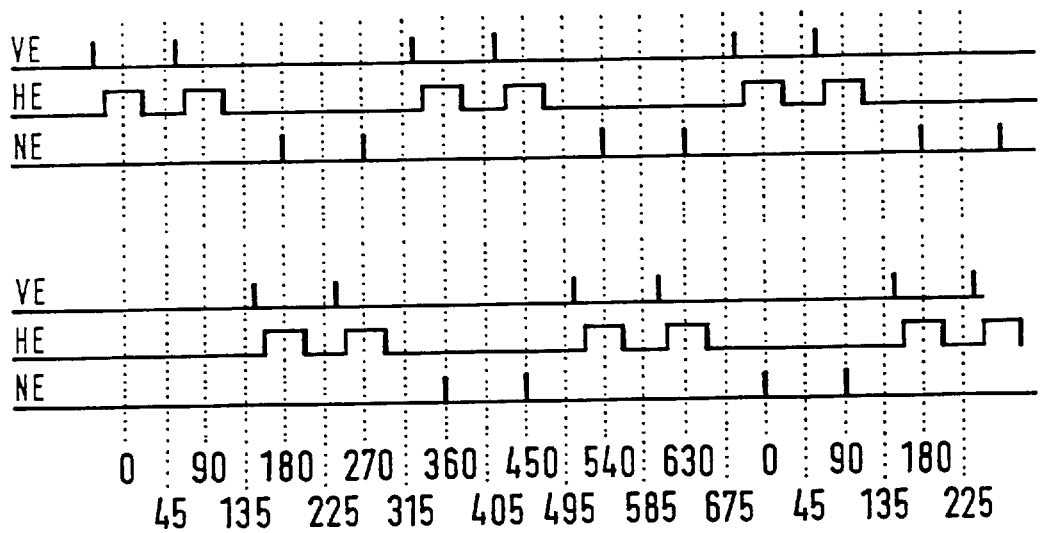
FIG. 5b shows a second metering cycle of a third engine type plotted over the arc of crankshaft rotation.

In FIGS. 5a and 5b, the relationships are depicted for an eight-cylinder internal combustion engine. The metering operations take place at intervals of about 90 degrees crankshaft. FIG. 5a shows that the odd-numbered, i.e., the first, the third, the fifth, and the seventh cylinder are allocated to the first bank, and the even-numbered, i.e., the second, the fourth, the sixth, and the eighth cylinder are allocated to the second bank.

If the post-injection likewise follows in this case at about 180 degrees after the top dead center of the cylinder in question, then there is a post-injection for the following cylinder of the same bank. In such an arrangement, a post-injection is only possible within a limited range, comparably to the case of an internal combustion engine having four cylinders and one bank.

FIG. 5b illustrates an embodiment according to the present invention in which the first and second, and the fifth and sixth cylinder are allocated to the first bank, and the third and fourth, as well as the seventh and eighth to the second bank. Two cylinders, which follow one another in the firing order, are allocated at any one time to one bank.

The post-injection can follow the first of one group of two cylinders in an interval of between 160 and 290 degrees following the top dead center of the first cylinder. Accordingly, the injection can follow the second cylinder at any one time between 100 and 200 degrees crankshaft following the top dead center of the cylinder in question.

The post-injection of the cylinders in question takes place in that crankshaft segment in which the injection is made into the respective cylinders of the second bank.

What is claimed:

1. A method for controlling an internal combustion engine, comprising the steps of:

metering fuel to the engine using a fuel metering device, the fuel being burned in the engine;

performing an exhaust gas after treatment using an exhaust gas after treatment device;

following a combustion of the fuel, performing a post-injection of additional fuel into the engine using the fuel metering device, the additional fuel reacting in the exhaust gas after treatment device, wherein the engine includes four or six cylinders, the cylinders being allocated to at least two banks such that cylinders which follow one another in a firing order are allocated to different banks.

2. The method according to claim 1, wherein the post-injection is performed with only every n-th metering of fuel.

3. A method for controlling an internal combustion engine, comprising the steps of:

metering fuel to the engine using a fuel metering device, the fuel being burned in the engine;

performing an exhaust gas after treatment using an exhaust gas after treatment device;

following a combustion of the fuel, performing a post-injection of additional fuel into the engine using the fuel metering device, the additional fuel reacting in the exhaust gas after treatment device, wherein the engine includes eight cylinders, the cylinders being allocated to first and second banks such that two of the cylinders that follow one another in a firing order are allocated to the first bank and a following two of the cylinders are allocated to the second bank.

4. The method according to claim 3, wherein the post-injection is performed with only every n-th metering of fuel.

5. A device for controlling an internal combustion engine, comprising:

a first arrangement metering fuel to the engine, the fuel being burned in the engine; and a second arrangement performing an exhaust gas after treatment, the first arrangement performing a post-injection of additional fuel into the engine following a combustion of the fuel, the additional fuel reacting in the second arrangement, and wherein the engine includes four or six cylinders, the cylinders being allocated to at least two banks such that cylinders which follow one another in a firing order are allocated to different banks.

6. The device according to claim 5, wherein the first arrangement includes a common-rail system.

7. The device according to claim 5, wherein the post-injection is performed with only every n-th metering of fuel.

8. A device for controlling an internal combustion engine, comprising:

a first arrangement metering fuel to the engine, the fuel being burned in the engine; and a second arrangement performing an exhaust gas after treatment, the first arrangement performing a post-injection of additional fuel into the engine following a combustion of the fuel, the additional fuel reacting in the second arrangement, and wherein the engine includes eight cylinders, the cylinders being allocated to first and second banks such that two of the cylinders that follow one another in a firing order are allocated to the first bank and a following two of the cylinders are allocated to the second bank.

9. The device according to claim 8, wherein the first arrangement includes a common-rail system.

10. The device according to claim 8, wherein the post-injection is performed with only every n-th metering of fuel.

* * * * *